United States Patent [19]

Hopenfeld

[11] Patent Number: 5,200,615
[45] Date of Patent: Apr. 6, 1993

[54] METHOD AND APPARATUS FOR DETECTING THE PRESENCE OF FLUIDS

[76] Inventor: Joram Hopenfeld, 1724 Yale Pl., Rockville, Md. 20850

[21] Appl. No.: 720,229

[22] Filed: Jun. 25, 1991

[51] Int. Cl.⁵ ............................................. H01J 5/16
[52] U.S. Cl. .................................... 250/302; 250/303; 250/301; 250/356.2; 250/227.21
[58] Field of Search ............ 250/302, 303, 301, 356.2, 250/357.1, 458.1, 461.1, 227.21, 227.25; 385/12, 13

[56] References Cited

U.S. PATENT DOCUMENTS

| | | |
|---|---|---|
| 539,234 | 5/1895 | Neu . |
| 1,123,012 | 12/1914 | Roby . |
| 1,135,798 | 4/1915 | Hirschmann . |
| 1,271,865 | 7/1918 | Dodds . |
| 2,386,412 | 10/1945 | Wakefield . |
| 2,759,175 | 8/1956 | Spalding . |
| 3,045,223 | 7/1962 | Kapany et al. . |
| 3,255,324 | 6/1966 | Ovshinsky . |
| 3,383,863 | 5/1968 | Berry . |
| 3,470,340 | 9/1969 | Hakka . |
| 3,492,449 | 1/1970 | Kenny . |
| 3,540,025 | 11/1970 | Levin et al. . |
| 3,548,137 | 12/1970 | Farrell et al. . |
| 3,564,526 | 2/1971 | Butts . |
| 3,721,898 | 3/1973 | Dragoumis et al. . |
| 3,787,650 | 1/1974 | Lewis . |
| 3,867,837 | 2/1975 | Malin . |
| 3,970,863 | 7/1976 | Kishikawa et al. . |
| 3,995,168 | 11/1976 | Neuscheler et al. . |
| 4,038,650 | 7/1977 | Evans et al. ........................... 385/12 |
| 4,045,668 | 8/1977 | Pitt et al. . |
| 4,069,838 | 1/1978 | Hansel et al. . |
| 4,118,105 | 10/1978 | Voigt . |
| 4,155,013 | 5/1979 | Spiteri . |
| 4,156,149 | 5/1979 | Vaccari . |
| 4,159,420 | 6/1979 | Tsunoda ........................ 250/227.25 |
| 4,188,634 | 10/1978 | Carvalko et al. . |
| 4,246,575 | 1/1981 | Purtell et al. . |
| 4,256,403 | 3/1981 | Powell . |
| 4,266,878 | 5/1981 | Auer . |
| 4,270,049 | 5/1981 | Tanaka et al. ........................ 385/12 |
| 4,379,289 | 4/1983 | Peek . |
| 4,386,269 | 5/1983 | Murphy . |
| 4,468,567 | 8/1984 | Sasano et al. . |
| 4,634,856 | 1/1987 | Kirkham . |
| 4,645,923 | 2/1987 | De Blok et al. ..................... 250/227 |
| 4,675,527 | 6/1987 | Asher et al. ........................ 250/393 |
| 4,682,156 | 7/1987 | Wainwright ........................ 340/603 |
| 4,682,895 | 7/1987 | Costello ............................ 356/402 |
| 4,689,484 | 8/1987 | McMahon . |
| 4,749,856 | 6/1988 | Walker et al. ..................... 250/227 |
| 4,763,009 | 8/1988 | Février et al. .................... 250/458.1 |
| 4,764,671 | 8/1988 | Park .................................. 250/577 |
| 4,779,453 | 10/1988 | Hopenfeld . |
| 4,812,014 | 3/1989 | Sawano et al. . |
| 4,827,121 | 5/1989 | Vidrine, Jr. et al. . |
| 4,834,496 | 5/1989 | Blyler, Jr. et al. . |
| 4,842,783 | 6/1989 | Blaylock ............................. 385/12 |
| 4,851,817 | 7/1989 | Brossia et al. . |
| 4,857,472 | 8/1989 | Wolfbeis ......................... 250/458.1 |
| 4,882,499 | 11/1989 | Luukkala et al. . |
| 4,888,455 | 12/1989 | Hanson . |

(List continued on next page.)

OTHER PUBLICATIONS

Seitz, CRC Critical Review in Analytical Chemistry (1988), vol. 19, Iss. 2, pp. 135-173.

(List continued on next page.)

Primary Examiner—Jack I. Berman
Assistant Examiner—Kiet T. Nguyen

[57] ABSTRACT

A method and apparatus particularly for monitoring leakage of a fluid contained within a double-walled tank into its interstitial space is disclosed. The sensor includes an element which is subject to physical change upon exposure to the material contained in the tank. The condition of the element is remotely monitored to determine leakage. In the case of an underground tank or oceangoing vessel, a second similar sensor sensitive to water may be employed to differentiate leakage into the interstitial space of the material in the tank from ground or sea water.

28 Claims, 3 Drawing Sheets

U.S. PATENT DOCUMENTS

| | | | |
|---|---|---|---|
| 4,897,551 | 1/1990 | Gersh et al. | 250/301 |
| 4,915,473 | 4/1990 | Haese et al. | 350/96.29 |
| 4,920,261 | 4/1990 | Bock et al. | 250/227.17 |
| 4,922,748 | 5/1990 | Hopenfeld . | |
| 4,934,811 | 6/1990 | Watts et al. | 356/73 |
| 5,004,913 | 4/1991 | Kleinerman | 250/458.1 |
| 5,005,005 | 4/1991 | Brossia et al. | 250/573 |
| 5,015,843 | 5/1991 | Seitz et al. | 250/227.21 |
| 5,030,420 | 7/1991 | Bacon et al. | 250/458.1 |
| 5,043,285 | 8/1991 | Surgi | 250/458.1 |
| 5,062,686 | 11/1991 | Barrow et al. . | |
| 5,096,671 | 3/1992 | Kane et al. | 356/412 |

OTHER PUBLICATIONS

Kawahara, Analytica Chimica Acta, (1983), 151, pp. 315–325.
Sutherland, Analytical Letters, (1984), 17(B1), pp. 45–53.
Giuliani, Sensors and Actuators, (1984), 6, pp. 107–112.
Butler, Appl. Phys. Lett. (1984), 45, pp. 1007–1009.
Dessy, Analytical Chemistry, (1985), 57, pp. 1188–1202.
Giuliani, Optics Letters (1983), 8, pp. 54–56.
Goldfinch, Analytical Biochemistry (1984), 138, pp. 430–436.
Goldfinch, Analytical Biochemistry (1980), 109, pp. 216–221.
Freeman, Analytica Chimica Acta (1985), 177, pp. 121–128.
Smith, Applied Spectroscopy (1988), 42, pp. 1469–1472.
Pawliszyn, Rev. Sci, Instrum. (1987), 58, pp. 245–248.
Katchalsky, J. Polymer, Sci. (1951), 7.
Feigenbaum, J. Poly. Sci (1971), 9, pp. 817–820.
Kissinger, Measurements & Control, Apr. 1988.
Giallorenzi et al, "Optical-fiber Sensors Challenge the Competition", IEEE Spectrum, Sep. 1986, pp. 44–47 (partial copy).
Shelley, "Newsfront" article, Chemical Engineering, Jan. 1991 pp. 31, 33 & 35.
Rica, "Inhibitor-injection Program Showing Early Promise", Oil & Gas Journal, May 13, 1991, pp. 57–59.
Brochures of In-Situ, Inc., re: KW-140 Monitor, KW-240 Monitor, KW-241 Monitor, KW-242 Monitor, Leak Detection Systems, and Remote Stations, all undated.
"Lab Watch" The Energy Daily, May 15, 1991.

METHOD AND APPARATUS FOR DETECTING THE PRESENCE OF FLUIDS

BACKGROUND OF THE INVENTION

1. Field of the Invention

This invention relates to detection of leaks in double-wall tanks, pipelines and hulls.

2. Description of the Prior Art

Due to public sensitivity concerning the leakage of dangerous chemicals and the like into the environment, tanks, piping and ship hulls and the like are increasingly provided in double-walled configuration. For example, as a result of the Exxon Valdez oil spill, it is widely anticipated that shortly oil tankers will be required to have an inner hull, containing the oil, and an outer hull spaced from the inner hull for safety. Increasing numbers of states are similarly requiring underground and above ground storage tanks to be double-walled. Pipelines are also commonly double-walled.

However, providing a double-walled pipe, tank or hull is only a partial solution to the problem of leakage. Equipment for detecting leakage of the fluid being contained into the interstitial space between the inner and outer walls is also required, together with a method for locating the leak(s). Desirably, such equipment would remotely and automatically monitor a tank (for example) for leakage, so that little or no labor would be required for monitoring. Preferably, such equipment would be inexpensive to manufacture and install, and would be reliable for long periods of installation. Such a system would desirably provide a binary signal responsive to leakage of the material contained in the tank, pipe or hull, rather than an analog signal which would require periodic calibration. Still more particularly, in connection with underground storage tanks or ship hulls it would be desirable to provide a similar sensor for the detection of ground water, condensation, or sea water, for monitoring the condition of the outer tank or hull.

Several types of equipment have been provided and marketed in recent years in response to these problems. For example, In-Situ, Inc. of Laramie, Wyo. markets a line of monitors for detecting petroleum products in wells. See U.S. Pat. No. 4,682,156 to Wainwright. These devices employ a polymer latch member in a spring-loaded or weighted system for detection of hydrocarbons. When a hydrocarbon leaks into the space surrounding the polymer latch, the latch is dissolved. Bias provided by gravity or by a spring then causes a mechanical member to move upwardly, changing the condition of an alarm indicator at the top of the well. It will be apparent to those of skill in the art that such mechanical devices are unduly complex and subject to failure due to corrosion and the like, and that further elaboration is required if remote monitoring is to be accomplished. Further, such a device must be manually reset after an alarm is given.

A so-called "TraceTek 3000" system is marketed by Raychem Corporation of Menlo Park, Calif. This system is stated to comprise cables formed of a contamination resistant fluoropolymer imbedded with leak detecting wires. It is generally understood by the present inventor that a pulsed time-of-flight circuit is used to detect the location of leaks along the cable. The major disadvantage of this system is that the entire cable must be replaced following a leak. Furthermore, when the cable is moist it is not sensitive to product leaks.

A "Soil Sentry Liquid 330 system" sold by Arizona Instrument Company employs an optical probe. A beam of infrared light aimed at the tip of the probe detects the presence or absence of liquid. If dry, the light is reflected from the inside of the tip and is detected by an optically matched phototransistor. However, if the tip is immersed in liquid, light is refracted out of the probe, breaking the circuit. This device as described would appear to require relatively exacting assembly to insure that the beam is aimed properly at the tip of the probe. Moreover this device would not appear to be capable of differentiating water, for example, from gasoline.

Volatile chemical tracers have also been added to materials which are to be monitored such that the tracer can be detected in the interstitial space between the walls of a double-walled tank. Such systems, employing gas chromatography for tracer detection, are offered by Tracer Research Corporation of Tucson, Arizona. Sample collection and analysis in the operation of this system would be highly labor intensive.

Other systems create a vacuum in a tank to be monitored and detect holes by monitoring changes in the pressure in the tank. This would require a high degree of accuracy of the pressure-sensing instrumentation, and would require compensation for pressure changes resulting from temperature fluctuations.

SUMMARY OF THE INVENTION

It is accordingly an object of the invention to provide a simple, reliable, inexpensive and remotely monitorable apparatus for detecting leakage of stored fluids into the interstitial space between the inner and outer walls of a double-walled tank, pipe, or ship hull, and for similar uses.

It is a further object of the invention to provide such an apparatus capable of locating the leak of a stored fluid, and distinguishing the fluid from group water or moisture in the interstitial space.

According to the present invention, a plurality of remotely monitored sensors are provided in the interstitial space. Each sensor includes an element that undergoes a remotely detachable change when exposed to the material contained in the tank. For example, when it is desired to monitor leakage of gasoline, the sensor may comprise powders of a detectably radioactive material dispersed in a gasoline-soluble matrix. By disposing a Geiger counter or like detector in the vicinity of the sensor, a predictable signal wall be detected. If the sensor has been exposed to gasoline, the radioactive material will be dispersed and no signal will be detected, indicating that a leak has occurred.

In another embodiment of the invention, the sensor comprises an optically responsive element bonded to the sensor by a material which is dissolved upon exposure to the liquid of interest. For example, fluorescent or phosphor particles may be dispersed in an oil soluble matrix on the tip of the sensor. A light source, typically a light emitting diode (LED), illuminates a distal end of a first optical fiber. The proximal end of the cable is juxtaposed to the sensor to illuminate its tip. A distal tip of a second optical fiber is juxtaposed to the sensor, and its proximal tip is juxtaposed to a phototransistor or photomultiplier tube. When it is desired to monitor the status of the sensor, the LED is activated, illuminating the tip of the sensor. Under normal circumstances, the phosphor particles (for example) will emit light which is then collected by the second optical fiber and detected b the phototransistor. However, if the sensor has been exposed to gasoline, for example, the phosphor-containing matrix will have been dissolved off the tip, so that no return signal will be detected. A number of such sensors may be employed together with a like number of optical fiber pairs, to allow identification of the location of a leak. Alternatively, sensors comprising different fluorescent materials emitting light at different intensities or frequencies may be employed to differentiate between the sensors.

BRIEF DESCRIPTION OF THE DRAWINGS

The invention will be better understood if reference is made to the accompanying drawings, wherein similar elements are identified by the same reference numerals, and wherein.

DESCRIPTION OF THE PREFERRED EMBODIMENTS

Figure 1:
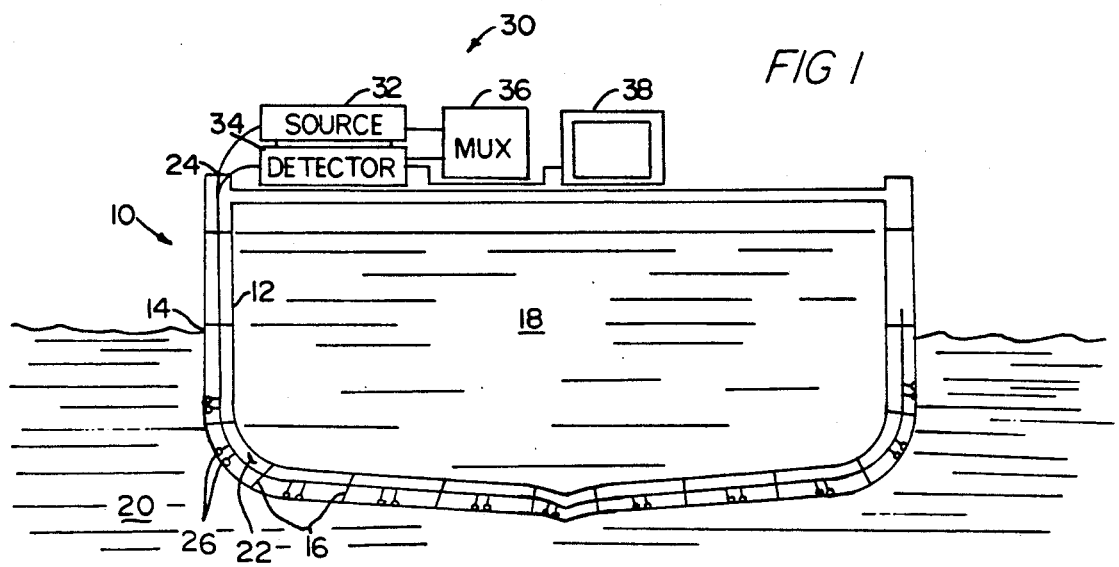
FIG. 1 is a cross-sectional view of a ship hull employing the leak detection system of the invention.

As shown schematically in FIG. 1, a modern tanker hull 10 will typically be double-walled, consisting of an inner wall 12 and an outer wall 14. Walls 12 and 14 are spaced from one another by stringers 16, defining an interstitial space 22 between the inner and outer walls. In order to detect leakage of the product 18 to be transported or of sea water 20 into the interstitial space 22, two groups of sensors 26 are disposed in the interstitial space. According to the invention, a first group of sensors 26 are sensitive to the product 18 carried by the tanker, and a second group of sensors 26 are sensitive to sea water. Sensors 26 are connected to a cable 24 so as to be periodically interrogated by a monitoring system shown generally at 30.

In an embodiment of the invention employing optical sensors, the proximal tips of a first group of optical fibers assembled into a cable are successively illuminated by a light source 32. The distal tips of the first optical fibers are juxtaposed to individual ones the sensors 26. The sensors of 26 of a first group provide a first optical response to light prior to exposure to the contents of the tank 18, and a second, substantially different response to light after exposure to the contents of the tank 18. The response of a second group of sensors 26 varies similarly upon exposure to sea water. The distal tip of a second optical fiber is juxtaposed to each sensor 26. The proximal end of each of the second optical fibers is juxtaposed to a detector 34. Accordingly, by periodically monitoring the responses of sensors 26 to incident light, leakage of either product 18 or sea water 20 into the interstitial space may be detected. Moreover, the location of the sensor exhibiting a response indicates the approximate location of the leak.

The successive illumination of each of the proximal ends of the first optical fibers by a single light source 32 (or actuation of individual light sources), and the juxtaposition of a single detector 34 to the proximal ends of the corresponding second optical fibers (or activation of individual detectors) is controlled by a multiplexing unit 36. The response of the detector(s) 34 is used to control a conventional display unit 38 indicating the status of each sensor 26. Implementation of the multiplexing unit 36 and display unit 38 is generally within the skill of the art. Sensors 26 disposed in various compartments of the interstitial space 22 are automatically remotely monitored at intervals of time, to determine, for example, whether either the contents 18 of the tank or sea water 20 are leaking into the corresponding section of the interstitial space.

Figure 2:
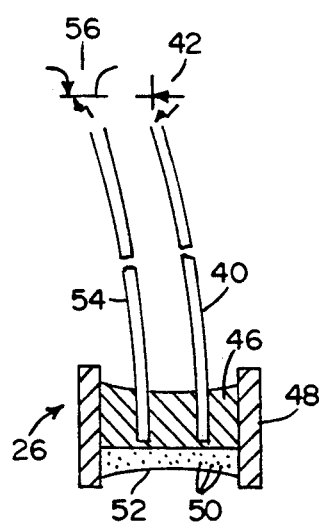
FIG. 2 is a cross-sectional view of a first embodiment of an optical leak sensor according to the invention.

FIG. 2 shows a first embodiment of an optical sensor 26 according to the invention. A first optical fiber 40 is juxtaposed to a light source 42 which may be a light emitting diode (LED), a laser, or the like. As indicated above, a multiplexing unit 36 may be employed to sequentially direct light from individual sources 42 or a single source 32 (FIG. 1) onto the proximal ends of a number of similar optical fibers 40 carrying light to a like number of sensors 26. Light from the source 42 enters the optical fiber 40 at its proximal end, and travels down the optical fiber 40 to its distal end, which may be secured by potting in a transparent epoxy material 46 confined in a tubular body 48. Fluorescent or phosphor powders 50 are embedded in an outer layer 52 of a further transparent adhesive, soluble in the product to be detected. For example, if the tank contains gasoline, diesel or jet fuel, the adhesive of outer layer 52 may be an oil-soluble epoxy. Under normal circumstances, light from the source 42 at distal tip of optical fiber 40 illuminates the particles 50, which emit light incident on the distal tip of a second optical fiber 54, also potted in epoxy 46. This light is carried by second optical fiber 54 back to a photodetector 56, typically provided as part of the detector 34 (FIG. 1).

If the sensor 26 is then exposed to a petrochemical such as leaking gasoline, diesel or jet fuel, the oil-soluble epoxy 52 is dissolved and washed away such that the light-emitting particles 50 will be removed, and no signal will be detected by detector 56 upon subsequent illumination by source 42. This lack of response can be used to provide a signal of leakage. The same materials are soluble in many toxic chemicals, so that the same sensors can be used to detect their leakage.

If instead it is desired to monitor the presence of water in the interstitial space, the oil-soluble epoxy 52 is simply replaced with a water-soluble epoxy or the like. Sensors of both types can be disposed in the interstitial space to monitor leakage of both the contents of the tank or of water Display unit 38 can readily be controlled to provide an indication of the location of a sensor 26 having detected a leak, and of the leaked material.

The water-soluble epoxy may be designed to release the light-emitting material selectively over time. For example, during construction of a pipeline or double-hulled vessel, it may be expected that the interstitial space will be full of water. In this case, the epoxy 52 may be coated with a further layer of a slowly dissolving epoxy, thus protecting the layer 52 from dissolving during the initial construction period.

Figure 3:
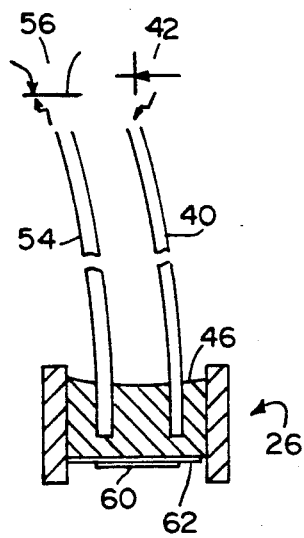
FIG. 3 is a comparable view of a second embodiment of an optical leak sensor according to the invention.

FIG. 3 shows a second sensor 26, generally similar to that of FIG. 2 and similarly operated, except that in this case the fluorescent or phosphor material 50 is replaced with a reflective member 60 bonded to the surface of the transparent epoxy 46 by an oil or water-soluble adhesive 62, depending on the material desired to be monitored. Under normal circumstances light from source 42 is transmitted to the sensor by first optical fiber 40, is reflected by member 60, and retransmitted by the second optical fiber 54 for detection by photodetector 56. If the adhesive 62 is exposed to the corresponding fluid of interest, it is dissolved and the reflective member 60 becomes detached from the sensor 26, such that no return signal is detected by the detector 56.

Figure 4:
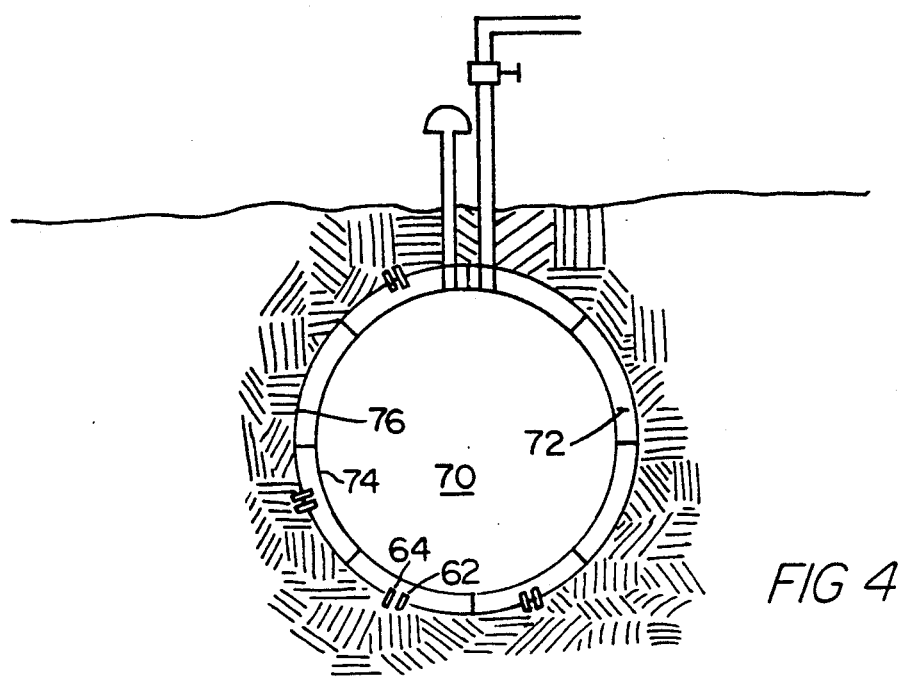
FIG. 4 shows a general arrangement of sensors, for example, for detecting the presence of gasoline and condensation or ground water in the interstitial space of a double-walled underground gasoline tank.

FIG. 4 shows a further embodiment of the invention in which one or more sensors of two different types, e.g., gasoline-sensitive sensors 63 and water-sensitive sensors 64, are disposed with their tips in the interstitial space 72 between the inner wall 74 and outer wall 76 of a gasoline-containing underground storage tank 70, for example. These sensors may be of the type discussed above with respect to FIGS. 1 and 2, or may comprise radioactive sensors discussed below in connection with FIG. 5. If outer wall 76 of the underground tank leaks, such that ground water enters the interstitial space 72, the water-sensitive sensors 64 provide a detectable output signal responsive to change in their physical characteristics. Similarly, the gasoline-sensitive sensors 63 undergo a physical change in the event gasoline leaks from the interior of the tank into the interstitial space. In either event monitoring apparatus as described generally at 30 in connection with FIG. 1 can be employed to provide an alarm signal responsive to the leakage.

Figure 5:
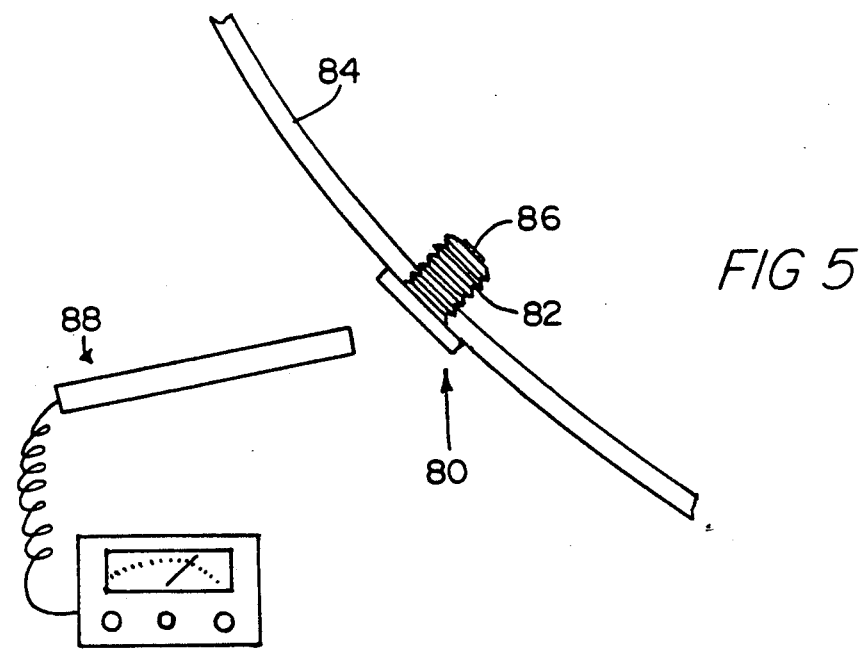
FIG. 5 is a schematic view of a radioactive sensor according to the invention, and illustrates the sensing technique employed therewith.

FIG. 5 shows a further embodiment of the sensor of the invention, used for remote detection of leakage into interstitial spaces or the like. In this case, the sensor 80 comprises a threaded body 82 for being turned into a threaded bore in an outer wall 84 of a tank, and again comprises a tip 86 having an externally monitorable physical characteristic changing upon exposure to a particular fluid of interest. For example, the tip 86 may comprise a small quantity of radioactive cobalt-60 particles in an adhesive matrix In the event the presence of gasoline in the interstitial space is to be detected, the adhesive matrix may be oil-soluble. The radioactive material might also be a foil adhered to the body 82 by an oil-soluble adhesive. A Geiger counter 88 or similar detector is juxtaposed to the sensor 80 to monitor its condition. Detector 88 may be attached to a long pole or a wire so as to be juxtaposed to the sensor 80 through a suitable access port. A detector might alternatively be permanently disposed in the vicinity of the sensor, and connected to a remote monitoring device, or might be periodically juxtaposed by a worker to a sensor on the outer wall of an above-ground tank or pipeline.

Under normal circumstances, a distinct radioactive signal will be detected. If the tip 86 has been exposed to gasoline, however, the adhesive will have been dissolved and the radioactive material dissipated, so that no radioactive signal will be detected, indicating a leak into the interstitial space 72. Such sensors 80 undergoing a physical change responsive to leakage of the material contained in the tank can be employed together with a like number of similar sensors which undergo a physical change responsive to the presence of water. Both can be monitored in a single operation, for detecting the presence of ground water in the interstitial space and differentiating it from leakage of the material being contained.

Figure 6:
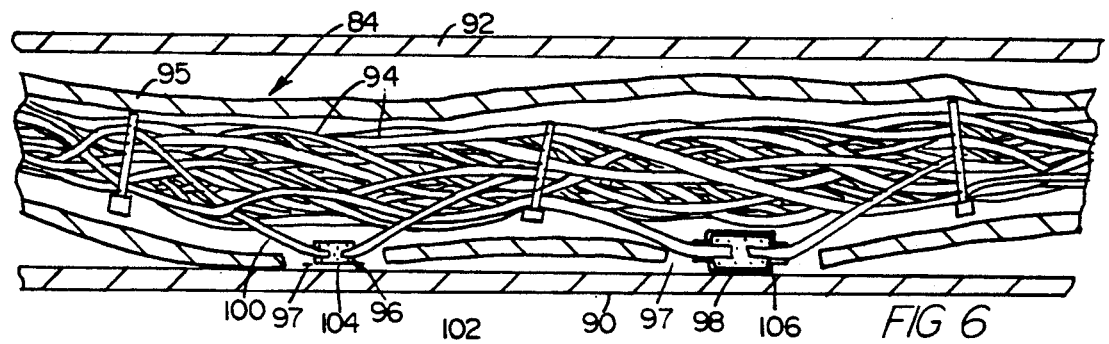
FIG. 6 shows the general arrangement of a cable for containing plural sets of sensors according to the invention, each set including two types of optical sensors according to the invention.

FIG. 6 shows a cable assembly 89 comprising a bundle of optical fibers 94 each connected to a sensor of a pair of sensors according to a further embodiment of the invention disposed in the interstitial space between an outer tank wall 90 and an inner wall 92. The bundle of fibers is protected by an outer sheath 95, e.g., of nylon, having slits 97 at the location of sensors 96, 98. Each pair of sensors includes a moisture sensitive sensor 96 and a sensor 98 sensitive to the presence of the product to be contained by the tank. The sensors each define an axial gap between an incoming optical fiber 100, which carries light to the sensor, and an outgoing optical fiber 102 which carries light exiting the sensor. By comparing the light transmitted to a remote photosensor (not shown) by the outgoing optical fiber 102 with light input to the input optical fiber 100 by a source (not shown), the light absorbed by the sensor 96 can be measured.

The ends of the optical fibers 100 and 102 are axially spaced from one another within each of the sensors 96 and 98 and are disposed in a porous liquid-absorbent matrix indicated generally at 104. The axial gap between fibers 100 and 102 may range between zero and 0.0005 inches, depending on the degree of sensitivity required. A similar porous matrix 104 may be used in both sensors. The sensor 98 which is optimized to detect the presence of the material contained within the inner wall 92 is identical to sensor 96 except that sensor 98 is further encapsulated within an outer sheath 106 which is insoluble in water, but is soluble in the material contained within the inner wall 92. It may be convenient to provide sheath 106 as a perforated plastic tube coated with a material soluble in the material to be contained but not in water.

In operation, the optical absorptivity of the first sensor 96 will vary with the amount of water or moisture in the interstitial space, while that of the second sensor 98 will not vary with moisture until the encapsulating sheath 106 has been dissolved by exposure to the product. Comparison of the relative absorptivities of the sensors over time thus can provide an indication of conditions in the interstitial space.

Figure 8:
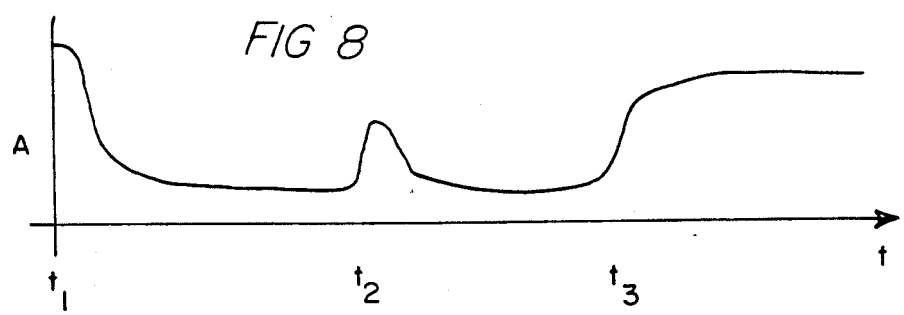
FIG. 8 shows the response of a second one of the sensors of FIG. 6 as a function of time.

FIG. 8 is an exemplary graph of the absorptivity A of the first sensor 96, which is sensitive to moisture versus time. The absorptivity may be relatively high at an initial stage $t_1$, supposing that the sensor is wetted during installation and assembly. Over time, as the moisture dries, the absorptivity drops to a relatively low, stable level. The spacing of this level from zero absorptivity may reflect the presence of dust, dirt, mud or the like in the porous matrix 104. Condensation due to seasonal weather variation may temporarily increase the absorptivity at $t_2$. If subsequently gasoline from the interior of the tank leaks into the interstitial space the absorptivity of the sensor 96 may increase at $t_3$.

As mentioned the sensor 98 is encapsulated in a water-insoluble, gasoline-soluble shell 106. Accordingly its absorptivity, shown as a function of time in FIG. 7, does not exhibit variation with moisture content as does the absorptivity of sensor 96, shown in FIG. 8. However, when gasoline enters the interstitial space at $t_3$, dissolving the encapsulating sheath 106, the absorptivity of sensor 98 to light changes markedly, as shown in FIG. 7.

Figure 7:
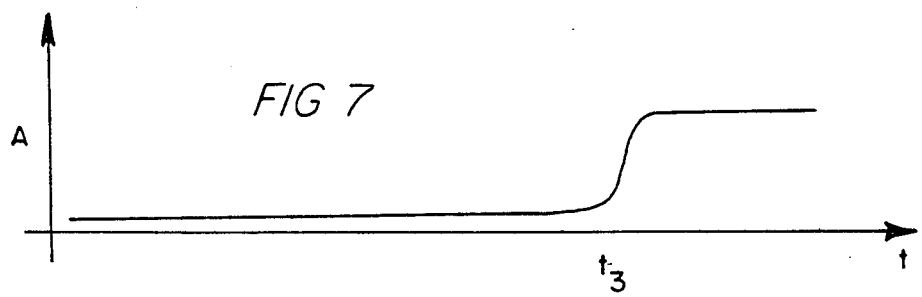
FIG. 7 shows the response of a first one of the sensors of FIG. 6 as a function of time.

Therefore by comparative monitoring of the two absorptivity signals shown as FIG. 7 and FIG. 8, it will be possible to distinguish between leakage of water and gasoline (or other monitored fluid) into the interstitial space, and therefore to derive a reliable indication of conditions therein. This information obviously is highly useful in safe maintenance of tanks, piping, hulls or the like over time.

As indicated above, the absorptivity of each of the individual sensors 96 and 98 can be monitored by connecting each sensor to input and output optical fibers 100 and 102, illuminating the proximal ends of the input fiber 100 and monitoring the light detected at the proximal end of an output optical fiber 102. This requires that the cable assembly 89 consist of a number of individual optical fibers 94 equal in number to the total numbers of sensors. Alternatively, the sensors can be connected in series by a single optical fiber, and a conventional optical time domain reflectometer used to detect any point along in the optical fiber at which there is substantial light loss due to the presence of water or the like between the axial ends of adjacent fiber segments.

Figure 9:
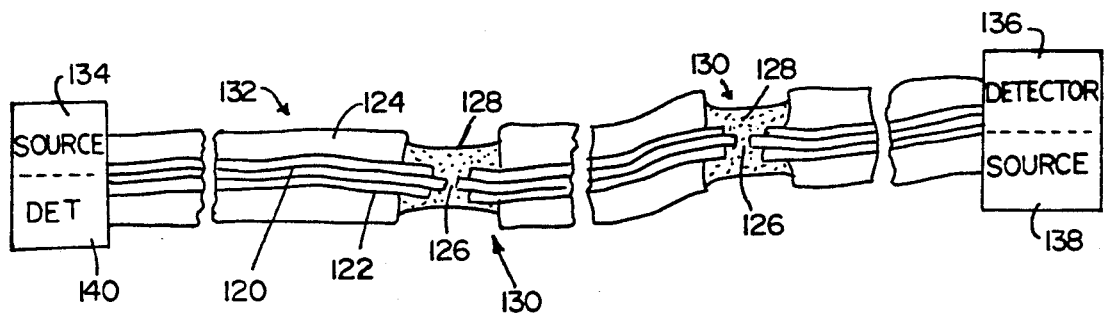
FIG. 9 is a cross-sectional view of a fiber optic cable comprising integral sensors for detecting leaks according to the invention.

In a further embodiment of the invention shown in FIG. 9, the optical characteristics of optical fibers are exploited to provide sensors for the presence of liquids. More specifically, optical fibers conventionally comprise a core 120 of a first optically transparent material, an outer cladding 122 of a second optical material typically of higher refractive index, and an outer protective sheath 124. According to the invention, the sheath 124 and optionally the outer cladding 122 are removed at intervals, and small axial gaps 126 are defined between adjacent sections of the core 120. An optically reactive coating 128, such as powders of a fluorescent material in a transparent matrix soluble in the material to be detected, is applied to cover the exposed core and fill the axial gap 126, forming a sensor 130. A cable 132 comprising a number of sensors 130 thus formed is disposed between a primary light source 134 and a primary detector 136, at either end of the cable 126, and a secondary source 138 and a secondary detector 140 at the opposite ends of the cable. Light transmitted down the cable 132 from the primary source 134 is partially attenuated at the gaps 126, while some fraction of the incident light is refracted into the optically-reactive coating 128. The light refracted into the coating 128 is absorbed and re-emitted by the fluorescent particles, for example, and continues to travel towards the detector 136. The net effect is that each sensor 130 provides a finite, stable impedance to the passage of light. The total impedance can be measured by comparing the light detected by the detector 136 with the light transmitted into the cable 132 at the source 134.

If one of the sensors 130 is exposed to a material in which the matrix of the coating 128 containing the fluorescent particles is soluble, the coating 128 will be removed from the axial gap 126 between the ends of the core 120, causing a readily detectable change in the total impedance of the cable 132 The change in the total transmissivity of the cable can be detected by detector 136 and used to provide an indication of a leak. Some fraction of the light will be reflected at the gap 126 from which the fluorescent material has been removed and may be detected at secondary detector 140. The total attenuation of the light measured by secondary detector 140 will provide an indication of the number of sensors 130 traversed by the light, and hence of the location of the affected sensor 130. Under these circumstances, the secondary source 138 can be energized to transmit light down the cable 132 from the opposite end, and detector 136 employed to measure its attenuation, providing a confirmation of the likely location of the damaged sensor.

In a further variation of this embodiment of the invention, the axial gaps between adjacent sections of the core may be eliminated by thinning the cladding 122 where it is desired to form sensors 130, and providing a coating 128 over the thinned sections of the cladding. The optical performance of the optical fiber will then vary at the locations of sensors 130 in a detectable manner since the leaking fluid will dissolve the coating and/or the cladding allowing the fluid to contact the bare core. Any subsequent change in the optical behavior of the fiber, e.g. after removal of the coating by exposure to a solvent, can be detected as described above.

It is also within this embodiment of the invention to employ fluorescent or phosphor materials responding differently to incident light in different sensors 130, for example, materials emitting light of differing frequencies in response to incident light, to enable differentiation between various sensors and location of a leak.

According to this aspect of the invention conventional fiber optic cables as used for communication may be provided with axial gaps 126 in the core and encapsulated in a transparent matrix containing fluorescent material particles, as described above; any change in the optical impedance of the cable could be detected as described above to determine the location of a flaw in the cable.

The sensors of the invention may also be employed to monitor leakage outside of single-walled tanks and the like. For example, where it is not economically feasible to replace conventional single-walled underground storage tanks with modern double-walled tanks, leakage may still be usefully monitored by disposing one or more of the sensors according to the invention in, for example, gravel-filled pits juxtaposed to the outer shells of the tank and monitoring their response over time. A number of such sensors can be multiplexed to monitor leakage from various portions of tanks, buried pipe lines and the like.

Other modifications and improvements to the method of the invention will occur to those of skill in the art. Therefore, the invention should not be measured by the above exemplary disclosure but only by the following claims.

What is claimed is:

1. A sensor, adapted to be disposed in a particular position for detecting the presence of a particular fluid, said sensor comprising a body and a fluid-sensitive member fixed to said body so as to be exposed to fluid in such position, said sensor exhibiting a remotely-monitorable physical characteristic capable of assuming one of two defined states, wherein the state of said characteristic is determined by a positional relationship between two or more components of said sensor, said positional relationship being maintained in a first condition by said member prior to exposure of said member to said particular fluid and being altered to a second condition upon exposure of said member to said particular fluid, whereupon said positional relationship between said two or more components is permanently altered, said sensor being arranged such that the state assumed by said physical characteristic can be detected remotely from said position.

2. The sensor of claim 1, wherein said member comprises a quantity of radioactive material bonded to said body by an adhesive which is at least partly soluble in said particular fluid.

3. The sensor of claim 2, wherein said particular fluid is a petrochemical and said adhesive is an oil-based epoxy.

4. The sensor of claim 3, wherein said radioactive material is a powder dispersed in said oil-based epoxy.

5. The sensor of claim 2, wherein said radioactive material is a foil adhered to said body by a water-soluble adhesive.

6. The sensor of claim 2, wherein said radioactive material is $Co_{60}$.

7. The sensor of claim 2, in combination with a radiation detector adapted to be juxtaposed to said sensor to determine the presence or absence of said radioactive material thereon.

8. The sensor of claim 1, wherein said member comprises a material which responds to incident light in a particular manner, said material being bonded to said body by an adhesive which is at least partly soluble in said particular fluid, in combination with optical inspection means comprising means for illuminating said member and means for detecting the response of said member to said illumination.

9. The combination of claim 8, wherein said material is a material that absorbs and re-emits light when irradiated by incident light.

10. The combination of claim 9, wherein said material is bonded to said body by an oil-soluble adhesive, and said particular fluid is a petrochemical.

11. The combination of claim 9, wherein said material is bonded to said body by a water-soluble adhesive.

12. The combination of claim 8, wherein said material is reflective.

13. The combination of claim 12, wherein said reflective material is adhered to said body by an oil-soluble adhesive, and said fluid is a petrochemical.

14. The combination of claim 12, wherein said reflective material is adhered to said body by a water-soluble adhesive.

15. The combination of claim 8, wherein said means for detecting comprises an optical fiber for detecting light emitted by the member and conveying said emitted light to a remote imaging device.

16. The combination of claim 15, wherein said means for illuminating comprises a further optical fiber for conveying light from a source to the member for illuminating said member.

17. The combination of claim 8, wherein a plurality of said sensors are individually juxtaposed to said optical inspection means, and in further combination with remote sensing means coupled to said optical inspection means for individually monitoring the response of the members of each of said sensors to illumination.

18. The combination of claim 17, wherein said means for illuminating the members of the sensors comprises a source of illumination disposed at the proximal ends of a first like plurality of optical fibers for providing illumination to said members, and said remote sensing means for individually monitoring the response of said members to said illumination comprises detector means disposed at the proximal ends of a second like plurality of optical fibers.

19. The combination of claim 18, wherein said first and second pluralities of optical fibers are assembled into a cable assembly, said sensors being disposed at spaced intervals along said cable assembly.

20. The combination of claim 18, wherein said means for illuminating comprises first multiplexing means for individually illuminating the proximal ends of first ones of said optical fibers, the distal ends of said first ones of said optical fibers being juxtaposed to members of particular ones of said sensors, and said remote sensing means for individually monitoring the responses of said members to said illumination comprises second multiplexing means for detecting the response of the members of said particular ones of said sensors, said responses being conveyed to said second multiplexing means by said second like plurality of optical fibers.

21. The sensor of claim 1, wherein said sensor comprises a body externally threaded to be turned into a tapped hole in the outer sheath of a double-walled vessel, said member being bonded to a tip of said body, whereby said member of said sensor is effectively disposed in the interstitial space between said outer sheath and the inner wall of said vessel.

22. A method of detecting the presence of a particular fluid in a particular position, comprising the steps of:
disposing at least one discrete sensor at said position, said discrete sensor comprising a body and a tip, said tip comprising a quantity of radioactive material adhered to said body by an adhesive which is at least partly soluble in aid particular fluid, said sensor being arranged such that the radioactive characteristic of said sensor can be detected remotely from said position; and
periodically monitoring said radioactive characteristic of said sensor employing a radiation detector adapted to be juxtaposed to said sensor to determine the presence or absence of said radioactive material on the tip thereof for detecting changes thereof responsive to exposure of said sensor to said fluid.

23. The method of claim 22, wherein said radioactive material is $Co_{60}$.

24. A method of detecting the presence of a particular fluid in a particular position, comprising the steps of:
disposing at least one discrete sensor at said position, said discrete sensor comprising an element which responds to incident light in a particular manner being joined to said sensor by an adhesive which is at least partly soluble in said particular fluid, such that upon exposure of said sensor to said fluid said element is separated from said sensor, said sensor being arranged such that the response of said element to incident light can be detected remotely from said position, whereby the presence or absence of said element at the location of said sensor can be remotely determined; and
periodically monitoring the condition of said sensor by illuminating said element and determining the presence or absence of said element responsive to said monitoring step.

25. The method of claim 24, wherein a plurality of said sensors are individually juxtaposed to a like plurality of optical inspection means, each optical inspection means comprising a first optical fiber means for conveying light from a source to the sensor for illuminating said element, and a second optical fiber for transmitting light emitted by the element to a remote detecting means, and said monitoring step is carried out by sequentially illuminating each of the elements by illuminating the proximal tip of the corresponding first optical fiber and detecting light emitted by the element and transmitted to the proximal end of the corresponding second optical fiber.

26. The method of claim 25, wherein each said sensor comprises axially spaced tips of first and second optical fibers which are axially aligned with one another and are disposed in a porous, optically substantially transparent matrix.

27. The method of claim 26, wherein a first group of said sensors are further encapsulated by a material which is insoluble in water but is soluble in said particular fluid.

28. A sensor assembly for monitoring the presence of a particular fluid at one or more spaced locations, comprising an optical fiber comprising a continuous core and a cladding over said core, at least said core being coated with an optically reactive coating comprising phosphor particles in a matrix of a substantially optically transparent material soluble in said fluid to be detected at spaced sensor locations along said fiber, and a detector means for monitoring the transmission of light along said fiber and for monitoring variation in said transmission of light over time.

* * * * *